US009493621B2

(12) United States Patent
Peters

(10) Patent No.: US 9,493,621 B2
(45) Date of Patent: *Nov. 15, 2016

(54) RIGID FOAM AND ASSOCIATED ARTICLE AND METHOD

(71) Applicant: SABIC Global Technologies B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/900,428

(22) PCT Filed: Jun. 24, 2014

(86) PCT No.: PCT/US2014/043773
§ 371 (c)(1),
(2) Date: Dec. 21, 2015

(87) PCT Pub. No.: WO2015/012989
PCT Pub. Date: Jan. 29, 2015

(65) Prior Publication Data
US 2016/0145405 A1    May 26, 2016

Related U.S. Application Data

(63) Continuation of application No. 13/948,416, filed on Jul. 23, 2013, now abandoned.

(51) Int. Cl.
| | |
|---|---|
| *C08J 9/00* | (2006.01) |
| *E04C 2/284* | (2006.01) |
| *C08J 9/02* | (2006.01) |
| *C08J 9/14* | (2006.01) |
| *C09K 21/14* | (2006.01) |
| *C08G 18/08* | (2006.01) |
| *C08G 18/32* | (2006.01) |
| *C08G 18/66* | (2006.01) |
| *C08G 18/76* | (2006.01) |
| *E04B 2/02* | (2006.01) |
| *E04C 2/20* | (2006.01) |
| *E04C 2/24* | (2006.01) |
| *C08G 101/00* | (2006.01) |

(52) U.S. Cl.
CPC .............. *C08J 9/0061* (2013.01); *C08G 18/14* (2013.01); *C08G 18/3206* (2013.01); *C08G 18/3218* (2013.01); *C08G 18/664* (2013.01); *C08G 18/7664* (2013.01); *C08J 9/02* (2013.01); *C08J 9/146* (2013.01); *C08J 9/147* (2013.01); *C09K 21/14* (2013.01); *E04B 2/02* (2013.01); *E04C 2/205* (2013.01); *E04C 2/243* (2013.01); *E04C 2/284* (2013.01); *C08G 2101/005* (2013.01); *C08G 2101/0025* (2013.01); *C08G 2101/0083* (2013.01); *C08J 2203/142* (2013.01); *C08J 2203/162* (2013.01); *C08J 2205/10* (2013.01); *C08J 2375/04* (2013.01); *C08J 2471/08* (2013.01); *C08J 2471/12* (2013.01); *C08J 2483/12* (2013.01)

(58) Field of Classification Search
CPC .......... C08J 9/0061; C08J 9/08; C08J 9/147; C08J 2471/08; C08J 2471/12; C08J 2205/10; C08J 2375/04; C08J 2203/142; E04B 2/02; E04C 2/205; E04C 2/243; C08G 18/14; C08G 18/3206; C08G 18/3218; C08G 18/664; C08G 18/7664; C08G 2101/0025; C08G 2101/005; C08G 2101/0083
See application file for complete search history.

(56) References Cited

U.S. PATENT DOCUMENTS

| | | |
|---|---|---|
| 2,768,994 A | 10/1956 | MacDonald |
| 2,998,409 A | 8/1961 | Dal Nogare et al. |
| 3,027,352 A | 3/1962 | Walling et al. |
| 3,306,874 A | 2/1967 | Hay |
| 3,383,340 A | 5/1968 | MacCallum et al. |
| 3,383,435 A | 5/1968 | Cizek |
| 3,513,114 A | 5/1970 | Hahn et al. |
| 3,836,829 A | 9/1974 | Eustance |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,873,477 A | 3/1975 | Beck et al. |

(Continued)

FOREIGN PATENT DOCUMENTS

| | | |
|---|---|---|
| CA | 2048079 | 1/1993 |
| CN | 102219978 A | 10/2011 |

(Continued)

OTHER PUBLICATIONS

Final Office Action for U.S. Appl. No. 14/044,904, filed Oct. 3, 2013; Notification date Dec. 24, 2015; 8 pages.
Yeager, G.; "Polyethers, Aromatic"; Encyclopedia of Polymer Science and Technology; vol. 11; 2004; pp. 64-87.
Advisory Action for U.S. Appl. No. 13/948,416, filed Jul. 23, 2013, Notification Date Dec. 10, 2015; 3 pages.
D. W. van Krevelen; "Some Basic Aspects of Flame Resistance of Polymeric Materials"; Polymer; 16; pp. 615-620; (1975).

(Continued)

*Primary Examiner* — John Cooney
(74) *Attorney, Agent, or Firm* — Cantor Colburn LLP

(57) ABSTRACT

A rigid polyurethane or polyisocyanurate foam includes 1 to 50 weight percent of a particulate poly(phenylene ether) having a mean particle size of 1 to 40 micrometers. The particulate poly(phenylene ether) imparts reduced flammability and reduced water absorption to the foam. The foam is useful as a thermally insulating material in articles including domestic appliances, building materials, tanks, pipelines, heating pipes, cooling pipes, cold stores, and refrigerated vehicles.

19 Claims, No Drawings

(56) References Cited

U.S. PATENT DOCUMENTS

| | | | |
|---|---|---|---|
| 3,955,987 A | 5/1976 | Schaar et al. |
| 3,972,902 A | 8/1976 | Heath et al. |
| 3,983,093 A | 9/1976 | Williams, III et al. |
| 4,009,137 A | 2/1977 | Dany et al. |
| 4,216,261 A | 8/1980 | Dias |
| 4,336,184 A | 6/1982 | Halpern |
| 4,341,694 A | 7/1982 | Halpern |
| 4,443,591 A | 4/1984 | Schmidt et al. |
| 4,455,410 A | 6/1984 | Giles, Jr. |
| 4,623,558 A | 11/1986 | Lin |
| 4,801,625 A | 1/1989 | Parr et al. |
| 4,923,932 A | 5/1990 | Katayose et al. |
| 5,010,117 A | 4/1991 | Herrington et al. |
| 5,087,657 A | 2/1992 | Qureshi et al. |
| 5,147,710 A | 9/1992 | Bopp et al. |
| 5,169,887 A | 12/1992 | Snow et al. |
| 5,304,593 A | 4/1994 | Nishio et al. |
| 5,326,817 A | 7/1994 | Orikasa et al. |
| 5,534,291 A | 7/1996 | Fukumura et al. |
| 5,723,515 A | 3/1998 | Gottfried |
| 5,811,492 A | 9/1998 | Mori et al. |
| 5,834,565 A | 11/1998 | Tracy et al. |
| 5,852,139 A | 12/1998 | Scheckenbach |
| 6,045,883 A | 4/2000 | Akiyama et al. |
| 6,051,662 A | 4/2000 | Tracy et al. |
| 6,096,817 A | 8/2000 | McNamara |
| 6,096,821 A | 8/2000 | Adedeji et al. |
| 6,121,338 A | 9/2000 | Colman |
| 6,508,910 B2 | 1/2003 | Zhou et al. |
| 6,632,442 B1 | 10/2003 | Chyall et al. |
| 6,706,793 B2 | 3/2004 | Abu-Isa et al. |
| 6,756,430 B2 | 6/2004 | Matsuda et al. |
| 6,905,693 B2 | 6/2005 | Chyall et al. |
| 7,378,455 B2 | 5/2008 | Lu et al. |
| 7,429,800 B2 | 9/2008 | Lu et al. |
| 7,825,176 B2 | 11/2010 | Kim et al. |
| 7,829,614 B2 | 11/2010 | Ding et al. |
| 7,838,580 B2 | 11/2010 | Bauer et al. |
| 7,863,355 B2 | 1/2011 | Futterer et al. |
| 7,923,102 B2 | 4/2011 | Tilbrook et al. |
| 8,017,697 B2 | 9/2011 | Carrillo et al. |
| 8,026,303 B2 | 9/2011 | Levchik et al. |
| 8,206,808 B2 | 6/2012 | Khan et al. |
| 2001/0034430 A1 | 10/2001 | Yeager et al. |
| 2002/0028337 A1 | 3/2002 | Yeager et al. |
| 2002/0058780 A1 | 5/2002 | Moses et al. |
| 2003/0125479 A1 | 7/2003 | Kinsho et al. |
| 2003/0139492 A1 | 7/2003 | Abu-Isa |
| 2003/0139501 A1 | 7/2003 | Lewin |
| 2003/0158314 A1 | 8/2003 | Abu-Isa et al. |
| 2003/0209699 A1 | 11/2003 | Chyall et al. |
| 2003/0236361 A1 | 12/2003 | Yeager et al. |
| 2004/0092616 A1 | 5/2004 | Occhiello et al. |
| 2005/0032958 A1 | 2/2005 | Bauer et al. |
| 2005/0049362 A1 | 3/2005 | Buckley et al. |
| 2005/0070685 A1 | 3/2005 | Mitsui et al. |
| 2005/0154130 A1 | 7/2005 | Adedeji et al. |
| 2005/0170238 A1 | 8/2005 | Abu-Isa et al. |
| 2005/0171266 A1 | 8/2005 | Matthijssen et al. |
| 2005/0228087 A1 | 10/2005 | Murakami et al. |
| 2006/0018131 A1 | 1/2006 | Kim et al. |
| 2007/0027227 A1 | 2/2007 | Shutov |
| 2007/0066739 A1 | 3/2007 | Odle et al. |
| 2007/0093602 A1 | 4/2007 | Thompson-Colon et al. |
| 2007/0093635 A1 | 4/2007 | Ingelbrecht |
| 2007/0173582 A1 | 7/2007 | Rukavina et al. |
| 2008/0114102 A1 | 5/2008 | Balfour et al. |
| 2008/0206449 A1 | 8/2008 | Klei et al. |
| 2008/0206468 A1 | 8/2008 | Klei et al. |
| 2009/0142495 A1 | 6/2009 | Green et al. |
| 2009/0211967 A1 | 8/2009 | Delsman et al. |
| 2009/0275682 A1 | 11/2009 | Furukawa et al. |
| 2010/0004364 A1 | 1/2010 | Lee et al. |
| 2010/0010128 A1 | 1/2010 | Levchik et al. |
| 2010/0139944 A1 | 6/2010 | Guo et al. |
| 2010/0190886 A1 | 7/2010 | Schmitt et al. |
| 2010/0209645 A1 | 8/2010 | Breen et al. |
| 2010/0276055 A1 | 11/2010 | Martin |
| 2010/0304118 A1 | 12/2010 | Baidak et al. |
| 2011/0028631 A1 | 2/2011 | Lawson |
| 2011/0160421 A1 | 6/2011 | Tople et al. |
| 2011/0259514 A1 | 10/2011 | Boyle et al. |
| 2012/0037396 A1 | 2/2012 | Gu |
| 2012/0164462 A1 | 6/2012 | Schmitt et al. |
| 2012/0305238 A1 | 12/2012 | Duan et al. |
| 2012/0305283 A1 | 12/2012 | Kalayjian et al. |
| 2012/0329961 A1 | 12/2012 | Carrillo et al. |
| 2013/0345345 A1 | 12/2013 | Takamura |
| 2014/0005340 A1 | 1/2014 | Peters et al. |
| 2014/0074813 A1 | 3/2014 | Franks et al. |
| 2014/0100312 A1 | 4/2014 | Peters |
| 2015/0004402 A1 | 1/2015 | Tarkin-Tas et al. |
| 2015/0028247 A1 | 1/2015 | Peters |
| 2015/0191594 A1 | 7/2015 | Peters et al. |

FOREIGN PATENT DOCUMENTS

| | | |
|---|---|---|
| CN | 102492231 A | 6/2012 |
| CN | 102702562 A | 10/2012 |
| CN | 102731955 A | 10/2012 |
| CN | 101983987 B | 1/2013 |
| EP | 0119416 A1 | 9/1984 |
| EP | 1253164 A1 | 10/2002 |
| EP | 1896519 B1 | 10/2012 |
| FR | 2284638 | 4/1976 |
| GB | 1330947 A | 9/1973 |
| JP | S5165159 A | 6/1976 |
| JP | H01222951 A | 9/1989 |
| JP | H03197538 A | 8/1991 |
| JP | H04159366 A | 6/1992 |
| JP | 2519767 B1 | 7/1996 |
| JP | H09104094 A | 4/1997 |
| JP | 2001019839 A | 1/2001 |
| JP | 2002516369 A | 6/2002 |
| JP | 2003128909 A | 5/2003 |
| JP | 2005105009 A | 4/2005 |
| JP | 2006063114 | 3/2006 |
| JP | 2006063114 A | 3/2006 |
| JP | 2008050526 A | 3/2008 |
| KR | 19950011895 B1 | 10/1995 |
| WO | 9518841 A1 | 7/1995 |
| WO | 0060002 A1 | 10/2000 |
| WO | 0105886 A1 | 1/2001 |
| WO | 0123473 A1 | 4/2001 |
| WO | 02096996 A1 | 12/2002 |
| WO | 03002667 A2 | 1/2003 |
| WO | 2005113661 A1 | 12/2005 |
| WO | 2006042833 A1 | 4/2006 |
| WO | 2007050077 A1 | 5/2007 |
| WO | 2011134622 A1 | 11/2011 |
| WO | 2011134623 A1 | 11/2011 |
| WO | 2012045414 A1 | 4/2012 |
| WO | 2012113520 A1 | 8/2012 |
| WO | 2012164478 A1 | 12/2012 |
| WO | 2013058690 A1 | 4/2013 |

OTHER PUBLICATIONS

Written Opinion of International Searching Authority; International Application No. PCT/US2012/070829; International Filing Date Dec. 20, 2012; Date of Mailing Jul. 15, 2013; 4 pages.

Written Opinion for International Application No. PCT/US2014/069043, International Filing Date Dec. 8, 2014, Date of Mailing Mar. 31, 2015, 8 pages.

Written Opinion for International Application No. PCT/US2014/055737, International filing date Sep. 16, 2014, Date of mailing Dec. 15, 2014, 3 pages.

Written Opinion for International Application No. PCT/US2014/052594; International Filing Date Aug. 26, 2014; Date of Mailing Dec. 2, 2014; 5 pages.

(56) References Cited

OTHER PUBLICATIONS

Written Opinion for International Application No. PCT/US2014/052582; International filing date Aug. 25, 2014; Date of mailing Dec. 9, 2014; 6 pages.
Final Office Action for U.S. Appl. No. 13/948,416, filed Jul. 23, 2013; Notification date Oct. 2, 2015; 14 pages.
Final Office Action for U.S. Appl. No. 13/930,456, filed Jun. 28, 2013; Notification Date Sep. 17, 2015; 16 pages.
Fink, "Reactive Polymers Fundamentals and Applications: A Concise Guide to Industrial Polymers" Epoxy Resins, 3, 2013, 3 pages.
Written Opinion for International Application No. PCT/US2014/041515; International Filing Date Jun. 9, 2014; Date of Mailing Oct. 20, 2014; 7 pages.
International Search Report for International Application No. PCT/US2014/041515; International Filing Date Jun. 9, 2014; Date of Mailing Oct. 20, 2014; 5 pages.
International Search Report for International Application No. PCT/US2014/043773; Application Filing Date Jun. 24, 2014; Date of Mailing Oct. 20, 2014; 5 pages.
International Search Report for International application No. PCT/US2014/052582; International Filing Date Aug. 25, 2014; Date of mailing Dec. 9, 2014; 5 pages.
International Search Report for International Application No. PCT/US2014/052594; International Filing Date Aug. 26, 2014; Date of Mailing Dec. 2, 2014; 6 pages.
International Search Report for International Application No. PCT/US2014/069043, International Filing Date Dec. 8, 2014, Date of Mailing Mar. 31, 2015, 3 pages.
International Search Report; International Application No. PCT/US2012/070829; International Filing Date Dec. 20, 2012; Date of Mailing Jul. 15, 2013; 6 pages.
Levchik et al., "Thermal decomposition, combustion and fire-retardancy of polyurethanes—a review of the recent literature", Polymer International, vol. 53, pp. 1585-1610, 2004.
Non-Final Office Action for U.S. Appl. No. 14/044,904, filed Oct. 3, 2013; Notification date Jul. 2, 2015; 6 pages.
Non-Final Office Action for U.S. Appl. No. 13/538,295, filed Jun. 29, 2012; Notification date Sep. 3, 2015; 31 pages.
Non-Final Office Action for U.S. Appl. No. 13/538,295, filed Jun. 29, 2012; Notification date Feb. 4, 2015; 25 pages.
Non-Final Office Action for U.S. Appl. No. 13/538,295, filed Jun. 29, 2012; Notification date Aug. 27, 2014; 29 pages.
Non-Final Office Action for U.S. Appl. No. 13/930,456, filed Jun. 28, 2013; Notification date Mar. 24, 2015; 13 pages.
Non-Final Office Action for U.S. Appl. No. 13/948,416, filed Jul. 23, 2013; Notification Date Jun. 30, 2015; 10 pages.
Non-Final Office Action for U.S. Appl. No. 14/012,609, filed Aug. 28, 2013; Notification date Feb. 23, 2015; 11 pages.
Non-Final Office Action for U.S. Appl. No. 14/146,952, filed Jan. 3, 2014; Notification Date Aug. 28, 2015; 17 pages.
Written Opinion for International Application No. PCT/US2014/043773; Application Filing Date Jun. 24, 2014; Date of Mailing Oct. 20, 2014; 8 pages.
U.S. Appl. No. 13/647,829, filed Oct. 9, 2012.
U.S. Appl. No. 13/538,295, filed Jun. 26, 2012.
U.S. Appl. No. 14/012,609; "Blend of Poly(Phenylene Ether) Particles and Polyoxymethylene, Article Thereof, and Method of Preparation"; filed Aug. 28, 2013.
U.S. Appl. No. 14/015,044; "Composition and Article Comprising Thermoplastic Polyurethane and Particulate Engineering Polymer"; filed Aug. 30, 2013.
U.S. Appl. No. 14/146,952, filed Jan. 3, 2014.
U.S. Appl. No. 13/930,456, filed Jun. 28, 2013.
U.S. Appl. No. 14/044,904, filed Oct. 3, 2013.
Chap. 2, "Literature Review", in "Structure Property Relationships of Flexible Polyurethane Foams", Ashish Aneja, Dissertation, Virginia Polytechnic Institute and State University, Dept. of Chemical Engineering, Oct. 29, 2002.
Written Opinion of International Searching Authority; International Application No. PCT/US2012/069335; International Filing Date Dec. 13, 2012; Date of Mailing Apr. 26 2013; 4 pages.
Hare, "A Review of Polyurethanes: Formulation Variables and Their Effects on Performance," Journal of Protective Coatings and Linings, vol. 17, Issue 11, Nov. 2000, pp. 34-44.
International Search Report for International Application No. PCT/US2014/055737, International filing Sep. 16, 2014, Date of mailing Dec. 15, 2014, 6 pages.
International Search Report; International Application No. PCT/US2012/069335; International Filing Date Dec. 13, 2012; Date of Mailing Apr. 26, 2013; 4 pages.
Javni, et al.: Soybean-Oil-Based Polyisocyanurate Rigid Foams, Journal of Polymers and the Environment, 2004, vol. 12, No. 3, pp. 123-129 (abstract only).
Kim, et al.: Effect of Isocyanate Index on the Properties of Rigid Polyurethane Foams Blown by HFC 365 mfc, Macromolecular Research, 2008, vol. 16, No. 5, pp. 467-472.
SABIC Data Sheet for PPO 640 (http://kbam.geampod.com/kbam/reflection/assets/20423.pdf) Last Visited Nov. 14, 2014.
International Preliminary Report on Patentability for International Application No. PCT/US2014/043773, International Filing Date Jun. 24, 2014, Date of Mailing Nov. 4, 2015, 6 pages.
Non-Final Office Action dated Jul. 12, 2016; U.S. Appl. No. 14/015,044, filed Aug. 30, 2013 (88 pages).
Advisory Action dated Mar. 3, 2016; U.S. Appl. No. 14/044,904, filed Oct. 3, 2013 (7 pages).
Non-Final Office Action dated Mar. 11, 2016, U.S. Appl. No. 14/146,952, filed Jan. 3, 2014; (14 pages).

RIGID FOAM AND ASSOCIATED ARTICLE AND METHOD

CROSS REFERENCE TO RELATED APPLICATIONS

This application is a National Stage filing of International Application No. PCT/US2014/043773, filed Jun. 24, 2014, which claims priority to U.S. Non-Provisional application Ser. No. 13/948,416, filed Jul. 23, 2013, both of which are incorporated herein by reference in their entirety.

BACKGROUND OF THE INVENTION

Polyurethanes are prepared from compounds with at least two hydroxyl groups and compounds with at least two isocyanate groups. See, e.g., D. Randall and S. Lee, "The Polyurethanes Book", New York: John Wiley & Sons, 2003; and K Uhlig, "Discovering Polyurethanes", New York: Hanser Gardner, 1999. The isocyanate groups of the isocyanate compound react with the hydroxyl groups of the hydroxyl compound to form urethane linkages. In many cases, the hydroxyl compound is a low molecular weight polyether or polyester. The isocyanate compound can be aliphatic or aromatic, and in the preparation of linear polyurethanes is typically difunctional (i.e., it is a diisocyanate). However isocyanate compounds with greater functionality are used in preparing thermoset polyurethanes. The family of polyurethane resins is very complex because of the enormous variation in the compositional features of the hydroxyl compounds and isocyanate compounds. This variety results in a large numbers of polymer structures and performance profiles. Indeed, polyurethanes can be rigid solids, soft and elastomeric, or a have a foam (cellular) structure.

Rigid polyurethane and polyisocyanurate foams are particularly effective thermal insulators. Most applications are as insulating materials in construction. However, the inherent ability of polyurethane and polyisocyanurate foams to burn creates a need for reduced flammability. See, e.g., S. V. Levchik, E. D. Weil, "Thermal decomposition, combustion and fire-retardancy of polyurethanes—a review of the recent literature", *Polymer International*, volume 53, pages 1585-1610 (2004). Polyurethane and polyisocyanurate foams also exhibit high moisture absorption, with the absorbed moisture acting as a plasticizer that detracts from the physical properties of the foams.

There is therefore a need for polyurethane and polyisocyanurate foams exhibiting improved resistance to burning and/or reduced moisture absorption.

BRIEF SUMMARY OF EMBODIMENTS OF THE INVENTION

One embodiment is a polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03.

Another embodiment is an article comprising thermal insulation comprising polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03.

Another embodiment is a method of forming a polyurethane or polyisocyanurate foam, the method comprising: reacting a polyol and an isocyanate compound in the presence of a blowing agent and a particulate poly(phenylene ether) to form a polyurethane or polyisocyanurate foam; wherein the isocyanate compound comprises, on average, at least two isocyanate groups per molecule; wherein the particulate poly(phenylene ether) has a mean particle size of 1 to 40 micrometers; and wherein the polyurethane or polyisocyanurate foam comprises 1 to 50 weight percent of the particulate poly(phenylene ether).

These and other embodiments are described in detail below.

DETAILED DESCRIPTION OF THE INVENTION

The present inventor has determined that rigid polyurethane and polyisocyanurate foams exhibiting improved resistance to burning and/or reduced moisture absorption are obtained by incorporating particulate poly(phenylene ether) into the foams.

One embodiment is a polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03.

The polyurethane or polyisocyanurate foam comprises a particulate poly(phenylene ether). Poly(phenylene ether)s include those comprising repeating structural units having the formula

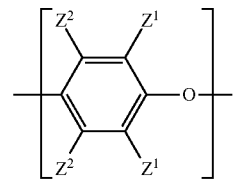

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue.

Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

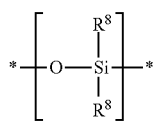

wherein each occurrence of $R^8$ is independently hydrogen, $C_1$-$C_{12}$ hydrocarbyl or $C_1$-$C_{12}$ halohydrocarbyl; and two terminal units having the structure

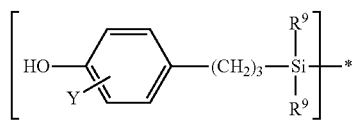

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, 2,3,6-trimethylphenol, or a combination thereof, and the hydroxyaryl-terminated polysiloxane has the structure

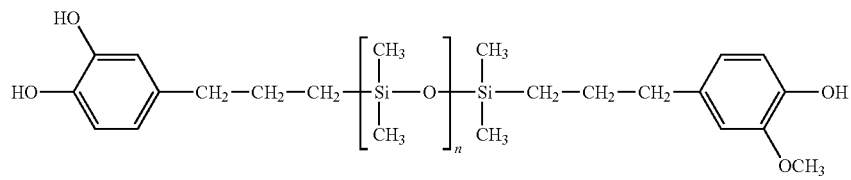

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. Patent Application Publication No. US 2012/0329961 A1 of Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof.

In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

The particulate poly(phenylene ether) has a mean particle size of 1 to 40 micrometers. Within this range, the mean particle size can be 1 to 20 micrometers, specifically 2 to 8 micrometers. In some embodiments, 90 percent of the particle volume distribution of the particulate poly(phenylene ether) is less than or equal to 23 micrometers, specifically less than or equal to 17 micrometers, more specifically 1 to 8 micrometers. In some embodiments, fifty percent of the particle volume distribution of the particulate poly(phenylene ether) is than or equal to 15 micrometers, specifically less than or equal to 10 micrometers, more specifically less than or equal to 6 micrometers. In some embodiments, ten percent of the particle volume distribution of the particulate poly(phenylene ether) is less than or equal to 9 micrometers, specifically less than or equal to 6 micrometers, more specifically less than or equal to 4 micrometers. In some embodiments, less than 10 percent, specifically less than 1 percent, and more specifically less than 0.1 percent, of the particle volume distribution is less than or equal to 38 nanometers. In some embodiments, the particles of the particulate poly(phenylene ether) have a mean aspect ratio of 1:1 to 2:1. Equipment to determine particle size and shape characteristics is commercially available as, for example, the CAMSIZER™ and CAMSIZER™ XT Dynamic Image Analysis Systems from Retsch Technology, and the QICPIC™ Particle Size and Shape Analyzer from Sympatec.

Particulate poly(phenylene ether) can be obtained according to methods readily available to the skilled artisan, for example by jet milling, ball milling, pulverizing, air milling, or grinding commercial grade poly(phenylene ether). "Classification" is defined as the sorting of a distribution of particles to achieve a desired degree of particle size uniformity. A classifier is often used together with milling for the continuous extraction of fine particles from the material being milled. The classifier can be, for example, a screen of certain mesh size on the walls of the grinding chamber. Once the milled particles reach sizes small enough to pass through the screen, they are removed. Larger particles retained by the screen remain in the milling chamber for additional milling and size reduction.

Air classification is another method of removing the finer particles from milling. Air classifiers include static classifiers (cyclones), dynamic classifiers (single-stage, multi-stage), cross-flow classifiers, and counter-flow classifiers (elutriators). In general, a flow of air is used to convey the particles from the mill to the classifier, where the fine particles are further conveyed to a collector. The coarse particles, being too heavy to be carried by the air stream, are returned to the mill for further milling and size reduction. In larger operations, air classification is more efficient, while in smaller operations a screen can be used.

The polyurethane or polyisocyanurate foam comprises the particulate poly(phenylene ether) in an amount of 1 to 50 weight percent, based on the total weight of the polyurethane or polyisocyanurate foam (which is equivalent to the total weight of the reaction mixture from which the foam is prepared). Within this range, the amount of particulate poly(phenylene ether) can be 3 to 40 weight percent, specifically 5 to 30 weight percent.

The polyurethane or polyisocyanurate foam has a core density of 0.03 to 0.7 grams/centimeter$^3$ determined at 23° C. using ASTM D 1622-03. Within this range, the core density can be 0.03 to 0.2 grams/centimeter$^3$, specifically 0.03 to 0.06 grams/centimeter$^3$.

Those skilled in the art understand that there is a continuum between polyurethane and polyisocyanurate foams. Both are prepared from polyisocyanates and polyols. Reaction mixtures used to prepare polyurethane and polyisocyanurate foams are characterized by an isocyanate index, which is calculated according to the equation $$\text{Isocyanate Index} = \frac{Moles_{NCO}}{Moles_{HOH} + Moles_{NH}} \times 100$$

wherein $Moles_{NCO}$ is the moles of isocyanate groups in the reaction mixture, $Moles_{OH}$ is the moles of OH groups in the reaction mixture from sources other than water (including OH groups from alcohols and carboxylic acid), $Moles_{HOH}$ is the moles of OH groups in the reaction mixture from water, and $Moles_{NH}$ is the moles of NH groups in the reaction mixture. When the reaction mixture molar ratio of isocyanate groups to hydroxyl groups is 1:1 and no water or NH groups are present in the reaction mixture, the isocyanate index is 100, and a "pure" polyurethane is formed. The products of reaction mixtures having an isocyanate index of 100 to 125, specifically 105 to 125, are typically characterized as polyurethanes, while the products of reaction mixtures having an isocyanate index of 180 to 350 are typically characterized as polyisocyanurates. Formation of isocyanurate groups is favored not only by high isocyanate indices, but also by use of catalysts for isocyanurate formation, such as N-hydroxyalkyl quaternary ammonium carboxylates.

In some embodiments, the polyurethane or polyisocyanurate foam is a product of a method comprising reacting a polyol and an isocyanate compound in the presence of a blowing agent and a particulate poly(phenylene ether) to form the polyurethane or polyisocyanurate foam, wherein the isocyanate compound comprises, on average, at least two isocyanate groups per molecule. The polyol can comprise, on average, at least two hydroxyl groups per molecule and often comprises three or more hydroxyl groups per molecule.

Polyols useful in the method include polyether polyols prepared by reacting an initiator containing 2 to 8 hydroxyl groups per molecule, specifically 3 to 8 hydroxyl groups per molecule, with an alkoxylating agent such as ethylene oxide, propylene oxide, or butylene oxide. Specific examples of polyols include ethoxylated saccharides, propoxylated saccharides, butoxylated saccharides, ethoxylated glycerins, propoxylated glycerins, butoxylated glycerins, ethoxylated diethanolamines, propoxylated diethanolamines, butoxylated diethanolamines, ethoxylated triethanolamines, propoxylated triethanolamines, butoxylated triethanolamines, ethoxylated trimethylolpropanes, propoxylated trimethylolpropanes, butoxylated trimethylolpropanes, ethoxylated erythritols, propoxylated erythritols, butoxylated erythritols, ethoxylated pentaerythritols, propoxylated pentaerythritols, butoxylated pentaerythritols, and combinations thereof. In some embodiments, the polyol is selected from propoxylated saccharides, propoxylated glycerins, propoxylated diethanolamines, propoxylated triethanolamines, propoxylated trimethylolpropanes, propoxylated erythritols, propoxylated pentaerythritols, and combinations thereof. Polyols further include aliphatic polyester diols, aromatic polyester polyols, and combinations thereof. In some embodiments, the polyol comprises a propoxylated sucrose, a propoxylated glycerin, an aromatic polyester diol, or a combination thereof.

Isocyanate compounds useful in the method include, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis (4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, and combinations thereof. In some embodiments, the isocyanate compound comprises an oligomeric diphenylmethane diisocyanate having an average of greater than 2 and less than or equal to 4 isocyanate groups per molecule.

Blowing agents useful in the method including physical blowing agents, chemical blowing agents, and combinations thereof. Physical blowing agents can be, for example, $C_{3-5}$ hydrofluoroalkanes and $C_{3-5}$ hydrofluoroalkenes. The hydrofluoroalkane and hydrofluoroalkene blowing agents can also contain one or more hydrogen atoms and/or halogen atoms other than fluorine. In some embodiments, the hydrofluoroalkane and hydrofluoroalkene blowing agents have a boiling point of 10 to 40° C. at 1 atmosphere. Specific physical blowing agents include 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl)propene, 1-chloro-3,3,3-trifluoropropene, 2-chloro-3,3,3-trifluoropropene, 1,1,1-trifluoro-2-butene, and combinations thereof. The physical blowing agent, when used, may be present at 2 to 20 weight percent, based on the total weight of the reaction mixture. Within this range, the physical blowing agent amount can be 2.5 to 15 weight percent.

Chemical blowing agents include water and carboxylic acids that reaction with isocyanate groups to liberate carbon dioxide. When present, chemical blowing agents, and specifically water, can be used in an amount of 0.2 to 5 weight percent, based on the total weight of the reaction mixture. Within this range, the chemical blowing agent amount can be 0.2 to 3 weight percent.

In addition to the polyol, the isocyanate compound, and the blowing agent, the reaction mixture can include additives such as, for example, catalysts, surfactants, fire retardants, smoke suppressants, fillers and/or reinforcements other than the particulate poly(phenylene ether), antioxidants, UV stabilizers, antistatic agents, infrared radiation absorbers, viscosity reducing agents, pigments, dyes, mold release agents, antifungal agents, biocides, and combinations thereof.

Catalysts include urethane catalysts, isocyanurate catalysts, and combinations thereof. Suitable catalysts include tertiary amine catalysts such as dimethylcyclohexylamine, benzyldimethylamine, N,N,N',N'',N''-pentamethyldiethylenetriamine, 2,4,6-tris-(dimethylaminomethyl)-phenol, triethylenediamine, N,N-dimethyl ethanolamine, and combinations thereof; organometallic compounds such as potassium octoate (2-ethyl hexanoate), potassium acetate, dibutyltin dilaurate, dibutlytin diacetate, and combinations thereof quaternary ammonium salts such as 2-hydroxpropyl trimethylammonium formate; N-substituted triazines such as N,N',N''-dimethylaminopropylhexahydrotriazine; and combinations thereof.

Suitable surfactants include, for example, polyorganosiloxanes, polyorganosiloxane polyether copolymers, phenol alkoxylates (such as ethoxylated phenol), alkylphenol alkoxylates (such as ethoxylated nonylphenol), and combinations thereof. The surfactants can function as emulsifiers and/or foam stabilizers.

The particulate poly(phenylene ether) contributes to the flame retardancy of the foam. Flame retardancy is also promoted by the use of aromatic polyester polyols, when employed, and isocyanurate groups, when formed. One or more additional flame retardants can, optionally, be included in the reaction mixture. Such additional flame retardants include, for example, organophosphorous compounds such as organic phosphates (including trialkyl phosphates such as triethyl phosphate and tris(2-chloropropyl)phosphate, and triaryl phosphates such as triphenyl phosphate and diphenyl cresyl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris(diethyl phosphinate); halogenated fire retardants such as tetrabromophthalate esters and chlorinated paraffins; metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

When present, additives are typically used in a total amount of 0.01 to 30 weight percent, based on the total weight of the reaction mixture. Within this range, the total additive amount can be 0.02 to 10 weight percent.

In a very specific embodiment of the polyurethane or polyisocyanurate foam, the polyurethane or polyisocyanurate foam has a core density of 0.02 to 0.06 grams/centimeter$^3$ determined at 23° C. using ASTM D 1622-03; the particulate poly(phenylene ether) is a particulate poly(2,6-dimethyl-1,4-phenylene ether); the particulate poly(phenylene ether) has a mean particle size of 2 to 8 micrometers; the particulate poly(phenylene ether) has a particle size distribution wherein 90 percent of the particle volume distribution is in the range of 1 to 8 micrometers; the polyurethane or polyisocyanurate foam comprises 5 to 30 weight percent of the particulate poly(phenylene ether); the polyurethane or polyisocyanurate foam is a product of a method comprising reacting a polyol and an isocyanate compound in the presence of a blowing agent and a particulate poly(phenylene ether) to form the polyurethane or polyisocyanurate foam, wherein the isocyanate compound comprises, on average, at least two isocyanate groups per molecule; the polyol comprises a wherein the polyol comprises a propoxylated sucrose, a propoxylated glycerin, an aromatic polyester diol, or a combination thereof; and the isocyanate compound comprises an oligomeric diphenylmethane diisocyanate having an average of greater than 2 and less than or equal to 4 isocyanate groups per molecule.

The polyurethane or polyisocyanurate foam is particularly useful as a thermal insulation material. Thus, one embodiment is an article comprising thermal insulation comprising polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03. All of the variations of the foam described above apply as well to the foam as a component of the article. Specific examples of articles that can utilize the polyurethane or polyisocyanurate foam as a thermal insulation material include domestic appliances (such as domestic and commercial refrigerators and freezers, and hot water tanks); building materials (such as wall and roofing panels, cut-to-size pieces from slab stock, and spray-in-place foam for insulation and sealing); thermally insulated tanks and containers, pipelines, heating pipes, cooling pipes, and cold stores; and thermally insulated refrigerated vehicles for road and rail including containers.

One embodiment is a method of forming a polyurethane or polyisocyanurate foam, the method comprising: reacting a polyol and an isocyanate compound in the presence of a blowing agent and a particulate poly(phenylene ether) to form a polyurethane or polyisocyanurate foam; wherein the isocyanate compound comprises, on average, at least two isocyanate groups per molecule; wherein the particulate poly(phenylene ether) has a mean particle size of 1 to 40 micrometers; and wherein the polyurethane or polyisocyanurate foam comprises 1 to 50 weight percent of the particulate poly(phenylene ether). Polyols, isocyanate compounds, and blowing agents are described above in the context of the product-by-process embodiments of the foam. All variations of the foam and the process described above apply as well to the present method of forming a polyurethane or polyisocyanurate foam.

In some embodiments of the method, the polyol, the isocyanate compound, and water, if any, are present in amounts sufficient to provide an isocyanate index of 180 to 350.

To prepare the polyurethane or polyisocyanurate foam, the polyol component and the isocyanate component, which have been temperature controlled and provided with additives, are thoroughly mixed together. The reaction starts after a short period of time and progresses with heat development. The reaction mixture is continually expanded by the blowing gases released, until the reaction product reaches the solid state as a result of progressive cross-linkage, the foam structure being retained.

The following stages are characteristic of the reaction and foaming process.

The mix time indicates the time needed for mixing the reactants.

The cream time is the time which elapses from the start of mixing of the reactants to the first definite appearance of foam expansion. In many cases this can be seen clearly by a color change as the reaction mixture begins to rise. With slow reacting mixtures this requires practiced observation.

The gel time is the interval of time between mixing the reactants and the formation of a non-flowing, semi-solid, jelly-like system. It is the time when the foam has developed enough gel strength to be dimensionally stable. After the gel time, the speed at which the foam rises slows down.

The rise time is the time from the start of mixing until the end of the optically perceptible rise. Hence it is the time until foam expansion ceases. The surface of the foam is still tacky when the rise process is complete.

The tack-free time is the time elapsing from the start of mixing to the moment when the foam surface has cured sufficiently that its surface is no longer tacky or sticky. The moment of freedom from tack can be determined by repeatedly testing the foam surface with a wooden rod.

In a specific embodiment of the method, the polyurethane or polyisocyanurate foam has a core density of 0.02 to 0.06 grams/centimeter$^3$ determined at 23° C. using ASTM D 1622-03; the particulate poly(phenylene ether) is a particulate poly(2,6-dimethyl-1,4-phenylene ether); the particulate poly(phenylene ether) has a mean particle size of 2 to 8 micrometers; the particulate poly(phenylene ether) has a particle size distribution wherein 90 percent of the particle volume distribution is in the range of 1 to 8 micrometers; the polyurethane or polyisocyanurate foam comprises 5 to 30 weight percent of the particulate poly(phenylene ether); the polyol comprises a propoxylated sucrose, a propoxylated glycerin, an aromatic polyester diol, or a combination thereof; and the isocyanate compound comprises an oligomeric diphenylmethane diisocyanate having an average of greater than 2 and less than or equal to 4 isocyanate groups per molecule.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03.

Embodiment 2

The polyurethane or polyisocyanurate foam of embodiment 1, having a core density of 0.03 to 0.06 grams/centimeter$^3$ determined at 23° C. using ASTM D 1622-03.

Embodiment 3

The polyurethane or polyisocyanurate foam of embodiment 1 or 2, wherein the polyurethane or polyisocyanurate foam is a polyurethane foam that is the product of a process characterized by an isocyanate index of 105 to 125.

Embodiment 4

The polyurethane or polyisocyanurate foam of embodiment 1 or 2, wherein the polyurethane or polyisocyanurate foam is a polyisocyanurate foam that is the product of a process characterized by an isocyanate index of 180 to 350.

Embodiment 5

The polyurethane or polyisocyanurate foam of any of embodiments 1-4, wherein the particulate poly(phenylene ether) is a particulate poly(2,6-dimethyl-1,4-phenylene ether).

Embodiment 6

The polyurethane or polyisocyanurate foam of any of embodiments 1-5, wherein the particulate poly(phenylene ether) has a mean particle size of 2 to 8 micrometers.

Embodiment 7

The polyurethane or polyisocyanurate foam of any of embodiments 1-6, wherein the particulate poly(phenylene ether) has a particle size distribution wherein 90 volume percent of the particle size distribution is in the range of 1 to 8 micrometers.

Embodiment 8

The polyurethane or polyisocyanurate foam of any of embodiments 1-7, comprising 5 to 30 weight percent of the particulate poly(phenylene ether).

Embodiment 9

The polyurethane or polyisocyanurate foam of any of embodiments 1-8, wherein the polyurethane or polyisocyanurate foam is a product of a method comprising reacting a polyol and an isocyanate compound in the presence of a blowing agent and a particulate poly(phenylene ether) to form the polyurethane or polyisocyanurate foam; wherein the isocyanate compound comprises, on average, at least two isocyanate groups per molecule.

Embodiment 10

The polyurethane or polyisocyanurate foam of embodiment 9, wherein the polyol comprises an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an aliphatic polyester diol, an aromatic polyester polyol, or a combination thereof.

Embodiment 11

The polyurethane or polyisocyanurate foam of embodiment 9, wherein the polyol comprises a propoxylated sucrose, a propoxylated glycerin, an aromatic polyester diol, or a combination thereof.

Embodiment 12

The polyurethane or polyisocyanurate foam of any of embodiments 9-11, wherein the isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

Embodiment 13

The polyurethane or polyisocyanurate foam of any of embodiments 9-11, wherein the isocyanate compound comprises an oligomeric diphenylmethane diisocyanate having an average of greater than 2 and less than or equal to 4 isocyanate groups per molecule.

Embodiment 14

The polyurethane or polyisocyanurate foam of embodiment 1, wherein the polyurethane or polyisocyanurate foam has a core density of 0.02 to 0.06 grams/centimeter$^3$ determined at 23° C. using ASTM D 1622-03; wherein the particulate poly(phenylene ether) is a particulate poly(2,6-dimethyl-1,4-phenylene ether); wherein the particulate poly(phenylene ether) has a mean particle size of 2 to 8 micrometers; wherein the particulate poly(phenylene ether) has a particle size distribution wherein 90 percent of the particle volume distribution is in the range of 1 to 8 micrometers; wherein the polyurethane or polyisocyanurate foam comprises 5 to 30 weight percent of the particulate poly(phenylene ether); wherein the polyurethane or polyisocyanurate foam is a product of a method comprising reacting a polyol and an isocyanate compound in the presence of a blowing agent and a particulate poly(phenylene ether) to form the polyurethane or polyisocyanurate foam, wherein the isocyanate compound comprises, on average, at least two isocyanate groups per molecule; wherein the polyol comprises a propoxylated sucrose, a propoxylated glycerin, an aromatic polyester diol, or a combination thereof; and wherein the isocyanate compound comprises an oligomeric diphenylmethane diisocyanate having an average of greater than 2 and less than or equal to 4 isocyanate groups per molecule.

Embodiment 14a

The polyurethane or polyisocyanurate foam of embodiment 14, wherein the polyurethane or polyisocyanurate foam is a polyurethane foam that is the product of a process characterized by an isocyanate index of 105 to 125.

Embodiment 14b

The polyurethane or polyisocyanurate foam of embodiment 14, wherein the polyurethane or polyisocyanurate foam is a polyisocyanurate foam that is the product of a process characterized by an isocyanate index of 180 to 350.

Embodiment 15

An article comprising thermal insulation comprising polyurethane or polyisocyanurate foam comprising 1 to 50 weight percent, based on the total weight of the polyurethane or polyisocyanurate foam, of a particulate poly(phenylene ether) having a mean particle size of 1 to 40 micrometers; wherein the polyurethane or polyisocyanurate foam has a core density of 0.03 to 0.7 grams/centimeter$^3$ determined at 23° C. using ASTM D 1622-03.

Embodiment 16

A method of forming a polyurethane or polyisocyanurate foam, the method comprising: reacting a polyol and an isocyanate compound in the presence of a blowing agent and a particulate poly(phenylene ether) to form a polyurethane or polyisocyanurate foam; wherein the isocyanate compound comprises, on average, at least two isocyanate groups per molecule; wherein the particulate poly(phenylene ether) has a mean particle size of 1 to 40 micrometers; and wherein the polyurethane or polyisocyanurate foam comprises 1 to 50 weight percent of the particulate poly(phenylene ether).

Embodiment 17

The method of embodiment 16, wherein the polyol, the isocyanate compound, and water, if any, are present in amounts sufficient to provide an isocyanate index of 180 to 350.

Embodiment 18

The method of embodiment 16, wherein the polyurethane or polyisocyanurate foam has a core density of 0.02 to 0.06 grams/centimeter$^3$ determined at 23° C. using ASTM D 1622-03; wherein the particulate poly(phenylene ether) is a particulate poly(2,6-dimethyl-1,4-phenylene ether); wherein the particulate poly(phenylene ether) has a mean particle size of 2 to 8 micrometers; wherein the particulate poly(phenylene ether) has a particle size distribution wherein 90 percent of the particle volume distribution is in the range of 1 to 8 micrometers; wherein the polyurethane or polyisocyanurate foam comprises 5 to 30 weight percent of the particulate poly(phenylene ether); wherein the polyol comprises a propoxylated sucrose, a propoxylated glycerin, an aromatic polyester diol, or a combination thereof; and wherein the isocyanate compound comprises an oligomeric diphenylmethane diisocyanate having an average of greater than 2 and less than or equal to 4 isocyanate groups per molecule.

The invention is further illustrated by the following non-limiting examples.

Examples 1-3, Comparative Example A

Raw materials used in the working examples are summarized in Table 1.

TABLE 1

| Reagent | Description |
|---|---|
| POLY-G ™ 74-376 | A mixture of propoxylated sucrose (CAS Reg. No. 9049-71-2) and propoxylated glycerin (CAS Reg. No. 25791-96-2), the mixture having an OH number of 368 milligrams KOH/gram and a viscosity of 2700 centipoise at 25° C.; available as POLY-G ™ 74-376 from Arch Chemicals, Inc. |
| TERATE ™ 4026 | An aromatic polyester polyol having an OH number of 200 milligrams/gram, a viscosity of 2500 centipoise at 25° C., a number average molecular weight of about 560 grams/mole, and about 2 hydroxyl groups per molecule; available as TERATE ™ 4026 from Invista. |
| RUBINATE ™ M | An oligomeric diphenylmethane diisocyanate having 31.0 weight percent isocyanate groups and an average of 2.7 isocyanate groups per molecule; available as RUBINATE ™ M from Huntsman. |
| DABCO ™ 33LV | 33 weight percent triethylenediamine in dipropylene glycol; available as DABCO ™ 33LV from Air Products. |
| NIAX ™ A-1 | 70 weight percent bis(dimethylaminoethyl)ether in dipropylene glycol; available as NIAX ™ A-1 from Momentive. |
| DABCO ™ TMR-4 | An N-hydroxyalkyl quaternary ammonium carboxylate (catalyst for formation of isocyanurate groups) having an OH number of 687 milligrams OH/gram and a viscosity of 34 centipoise at 25° C.; available as DABCO ™ TMR-4 from Air Products. |
| POLYCAT ™ 8 | N,N-dimethylcyclohexylamine; available as POLYCAT ™ 8 from Air Products. |
| DABCO ™ DC193 | A polysiloxane surfactant; available as DABCO ™ DC193 from Air Products. |
| ENOVATE ™ 3000 | 1,1,1,3,3-pentafluropropane (HFC-245fa); available as ENOVATE ™ 3000 from Honeywell |
| Particulate PPE | Poly(2,6-dimethyl-1,4-phenylene ether) particles having a mean particle size of 6.1 micrometers, 10 volume percent of particles less than 4.0 micrometers, 10 volume percent of particles greater than 8.1 micrometers, and a mean aspect ratio of 1.41:1. |

Particulate poly(2,6-dimethyl-1,4-phenylene ether) was obtained by jet milling commercial grade poly(phenylene ether) powder obtained as PPO™ 640 resin from Sabic Innovative Plastics. Compressed nitrogen gas was introduced into the nozzles of a jet mill to create a supersonic grinding stream. Particle-on-particle impact collisions in this grinding stream resulted in substantial particle size reductions. Large particles were held in the grinding area by centrifugal force while centripetal force drove finer particles toward the center of the discharge. A sieve of a specific upper size limit was then used in-line to recover particles with a precise size distribution and having diameters below the nominal sieve openings. Larger particles were recycled to the reduction size chamber for further grinding. The particulate poly(2,6-dimethyl-1,4-phenylene ether) was classified by passing the jet-milled particles through a screen with 6 micrometer openings. The particle size and shape characterization in Table 1 was determined using a CAMSIZER™ XT from Retsch Technology GmbH operating in air dispersion mode.

Rigid foams were prepared using a high-torque mixer (CRAFTSMAN™ Ten Inch Drill Press, Model No. 137.219000) at 3,100 rotations per minute. Polyol components and isocyanate components of the foam systems were mixed for 10 seconds. The resulting mixture was transferred into an open cake box before the cream time and allowed to free-rise. Foaming profile, including cream time, gel time, rise time, and tack-free time was determined on all foams.

All foams were cut and tested after aging at ambient conditions for one week. The following methods were used for testing of rigid foams. Core density values, expressed in grams/centimeter$^3$, were determined at 23° C. using ASTM D 1622-03 and a sample size of 5.08 centimeters×5.08 centimeters×2.54 centimeters (2 inches×2 inches×1 inch). Compressive strength values, expressed in megapascals, were determined at 23° C. using ASTM D 1621-00 and a sample size of 5.08 centimeters×5.08 centimeters×2.54 centimeters (2 inches×2 inches×1 inch) and a head speed of 2.5 millimeters/minute. Values of burning rate in a horizontal position, expressed in millimeters/minute, were determined according to ASTM D635-03 using a sample size of 15.24 centimeters×5.08 centimeters×1.27 centimeters (6 inches×2 inches×0.5 inch). Water absorption values, expressed in percent, were determined according to ASTM D 2842-01 using a sample size of 5.08 centimeters×5.08 centimeters× 2.54 centimeters (2 inches×2 inches×1 inch), and immersion in water for 96 and 168 hours at 25° C. and 1 atmosphere.

Table 2 summarizes examples in which the particulate poly(phenylene ether) was added only to the polyol component of the polyurethane formulation. The property results show that similar core densities were obtained for each foam, but, relative to Comparative Example A, inventive Examples 1-3 exhibited higher compressive strength values.

TABLE 2

|  | C. Ex. A | Ex. 1 | Ex. 2 | Ex. 3 |
|---|---|---|---|---|
| COMPOSITION | | | | |
| Polyol Component | | | | |
| POLY-G ™ 74-376 | 100 | 90 | 80 | 70 |
| Particulate PPE | 0 | 10 | 20 | 30 |
| Water | 4.5 | 4.5 | 4.5 | 4.5 |
| DABCO ™ DC193 | 2.5 | 2.5 | 2.5 | 2.5 |
| DABCO ™ 33LV | 0.6 | 0.6 | 0.6 | 0.6 |

TABLE 2-continued

|  | C. Ex. A | Ex. 1 | Ex. 2 | Ex. 3 |
|---|---|---|---|---|
| Isocyanate Component | | | | |
| RUBINATE ™ M | 173.62 | 163.85 | 154.07 | 144.3 |
| PROCESS | | | | |
| Isocyanate Index | 110 | 110 | 110 | 110 |
| PPE content (wt %) | 0 | 3.68 | 7.64 | 11.91 |
| Reaction Profile of Free-rise | | | | |
| No. of foaming experiments | 2 | 1 | 1 | 1 |
| Mix time (sec) | 10 | 10 | 10 | 10 |
| Cream time (sec) | 68 | 68 | 50 | 45 |
| Gel time (sec) | 290 | 145 | 133 | 120 |
| Rise time (sec) | 820 | 380 | 360 | 290 |
| Tack-free time (sec) | 1230 | 990 | 690 | 540 |
| PROPERTIES | | | | |
| Core density (g/cc) | 0.04101 | 0.04149 | 0.04197 | 0.04261 |
| Compressive Strength at Yield (MPa) | 0.1296 | 0.1859 | 0.1826 | 0.1882 |

Examples 4-6, Comparative Example B

In order to maximize the amount of the particulate poly (phenylene ether) in the polyurethane foam system, the particulate poly(phenylene ether) was added through both the polyol component and the isocyanate component of the foam systems. Compositions, processes, and properties are summarized in Table 3. The property results show that, relative to Comparative Example B, inventive Examples 4-6 with particulate poly(phenylene ether) exhibited reduced flammability and reduced water absorption.

TABLE 3

|  | C. Ex. B | Ex. 4 | Ex. 5 | Ex. 6 |
|---|---|---|---|---|
| COMPOSITION | | | | |
| Polyol Component | | | | |
| POLY-G ™ 74-376 | 100 | 85 | 80 | 75 |
| Particulate PPE | 0 | 44.9 | 61.2 | 78.2 |
| Water | 4.5 | 4.5 | 4.5 | 4.5 |
| DABCO ™ DC193 | 2 | 2 | 2 | 2 |
| DABCO ™ 33LV | 1.8 | 1.8 | 1.8 | 1.8 |
| NIAX ™ A-1 | 0.1 | 0.1 | 0.1 | 0.1 |
| Isocyanate Component | | | | |
| RUBINATE ™ M | 175.29 | 160.63 | 155.74 | 150.85 |
| PROCESS | | | | |
| PPE content (wt %) | 0 | 15 | 20 | 25 |
| Mode of particulate PPE addition: | | | | |
| Polyol Component (pbw) | 0 | 27.76 | 26.12 | 24.5 |
| Isocyanate Component (pbw) | 0 | 17.14 | 35.08 | 53.7 |
| Isocyanate Index | 110 | 110 | 110 | 110 |
| Reaction Profile of Free-rise | | | | |
| No. of foaming experiments | 4 | 3 | 3 | 3 |
| Mix time (sec) | 7 | 7 | 7 | 7 |
| Cream time (sec) | 13 | 13 | 13 | 12 |
| Gel time (sec) | 63 | 58 | 51 | 48 |
| Rise time (sec) | 95 | 98 | 93 | 85 |
| Tack-free time (sec) | 105 | 115 | 110 | 100 |

TABLE 3-continued

|  | C. Ex. B | Ex. 4 | Ex. 5 | Ex. 6 |
| --- | --- | --- | --- | --- |
| PROPERTIES | | | | |
| Core density (g/cc) | 0.03396 | 0.03829 | 0.04133 | 0.04037 |
| Compressive Strength at Yield (MPa) | 0.1646 | 0.2206 | 0.2023 | 0.1287 |
| Flammability - Burn Rate (cm/min) | 31.06 | 24.4 | 23.9 | 21.35 |
| Water Absorption at 25° C. | | | | |
| % change after 96 hours | 230 | — | — | 126 |
| % change after 168 hours | 239 | — | — | 153 |

Examples 7-9, Comparative Example C

Examples of polyisocyanurate foam systems are summarized in Table 4. The particulate poly(phenylene ether) was added through the both polyol component and isocyanate component of the foam systems. The property results show that, relative to Comparative Example C, inventive Examples 7-9 with particulate poly(phenylene ether) exhibited reduced flammability and reduced water absorption.

TABLE 4

|  | C. Ex. C | Ex. 7 | Ex. 8 | Ex. 9 |
| --- | --- | --- | --- | --- |
| COMPOSITION | | | | |
| Polyol Component | | | | |
| POLY-G ™ 74-376 | 50 | 45 | 42.5 | 40 |
| TERATE ™ 4026 | 50 | 45 | 42.5 | 40 |
| Particulate PPE | 0 | 33.25 | 38.25 | 68 |
| Water | 1 | 1 | 1 | 1 |
| DABCO ™ DC193 | 1.4 | 1.4 | 1.4 | 1.4 |
| POLYCAT ™ 8 | 0.4 | 0.4 | 0.4 | 0.4 |
| DABCO ™ TMR-4 | 2.1 | 2.1 | 2.1 | 2.1 |
| ENOVATE ™ 3000 | 25 | 25 | 30 | 30 |
| Isocyanate Component | | | | |
| RUBINATE ™ M | 192.23 | 177.1 | 169.6 | 162.05 |
| PROCESS | | | | |
| PPE content (wt %) | 0 | 10 | 15 | 20 |
| Mode of particulate PPE addition: | | | | |
| Polyol Component (pbw) | 0 | 27 | 25.5 | 24 |
| Isocyanate Component (pbw) | 0 | 6.25 | 13.5 | 44 |
| Isocyanate Index | 220 | 220 | 220 | 220 |
| Reaction Profile of Free-rise | | | | |
| No. of foaming experiments | 3 | 2 | 2 | 2 |
| Mix time (sec) | 7 | 7 | 7 | 7 |
| Cream time (sec) | 15 | 14 | 13 | 13 |
| Gel time (sec) | 70 | 58 | 53 | 47 |
| Rise time (sec) | 149 | 156 | 157 | 138 |
| Tack-free time (sec) | 260 | 256 | 235 | 255 |
| PROPERTIES | | | | |
| Core density (g/cc) | 0.03268 | 0.03380 | 0.03252 | 0.03460 |
| Compressive Strength at Yield (MPa) | 0.1648 | 0.1336 | 0.1166 | 0.1055 |
| Flammability - Burn Rate (cm/min) | 33.1 | 27.18 | 28.87 | 21.61 |
| Water Absorption at 25° C. | | | | |
| % change after 96 hours | 237 | — | — | 153 |
| % change after 168 hours | 239 | — | — | 173 |

The invention claimed is:

1. A polyurethane or polyisocyanurate foam comprising 1 to 50 weight percent, based on the total weight of the polyurethane or polyisocyanurate foam, of a particulate poly(phenylene ether) having a mean particle size of 2 to 8 micrometers; wherein the polyurethane or polyisocyanurate foam has a core density of 0.03 to 0.7 grams/centimeter$^3$ determined at 23° C. using ASTM D 1622-03.

2. The polyurethane or polyisocyanurate foam of claim 1, having a core density of 0.03 to 0.06 grams/centimeter$^3$ determined at 23° C. using ASTM D 1622-03.

3. The polyurethane or polyisocyanurate foam of claim 1, wherein the polyurethane or polyisocyanurate foam is a polyurethane foam that is the product of a process characterized by an isocyanate index of 105 to 125.

4. The polyurethane or polyisocyanurate foam of claim 1, wherein the polyurethane or polyisocyanurate foam is a polyisocyanurate foam that is the product of a process characterized by an isocyanate index of 180 to 350.

5. The polyurethane or polyisocyanurate foam of claim 1, wherein the particulate poly(phenylene ether) is a particulate poly(2,6-dimethyl-1,4-phenylene ether).

6. The polyurethane or polyisocyanurate foam of claim 1, wherein the particulate poly(phenylene ether) has a particle size distribution wherein 90 volume percent of the particle size distribution is in the range of 1 to 8 micrometers.

7. The polyurethane or polyisocyanurate foam of claim 1, comprising 5 to 30 weight percent of the particulate poly(phenylene ether).

8. The polyurethane or polyisocyanurate foam of claim 1, wherein the polyurethane or polyisocyanurate foam is a product of a method comprising
reacting a polyol and an isocyanate compound in the presence of a blowing agent and a particulate poly(phenylene ether) to form the polyurethane or polyisocyanurate foam;
wherein the isocyanate compound comprises, on average, at least two isocyanate groups per molecule.

9. The polyurethane or polyisocyanurate foam of claim 8, wherein the polyol comprises an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an aliphatic polyester diol, an aromatic polyester polyol, or a combination thereof.

10. The polyurethane or polyisocyanurate foam of claim 8, wherein the polyol comprises a propoxylated sucrose, a propoxylated glycerin, an aromatic polyester diol, or a combination thereof.

11. The polyurethane or polyisocyanurate foam of claim 8, wherein the isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

12. The polyurethane or polyisocyanurate foam of claim 8, wherein the isocyanate compound comprises an oligomeric diphenylmethane diisocyanate having an average of greater than 2 and less than or equal to 4 isocyanate groups per molecule.

13. The polyurethane or polyisocyanurate foam of claim 1, wherein the polyurethane or polyisocyanurate foam has a core density of 0.03 to 0.06 grams/centimeter$^3$ determined at 23° C. using ASTM D 1622-03;
wherein the particulate poly(phenylene ether) is a particulate poly(2,6-dimethyl-1,4-phenylene ether);
wherein the particulate poly(phenylene ether) has a particle size distribution wherein 90 percent of the particle volume distribution is in the range of 1 to 8 micrometers;
wherein the polyurethane or polyisocyanurate foam comprises 5 to 30 weight percent of the particulate poly(phenylene ether);
wherein the polyurethane or polyisocyanurate foam is a product of a method comprising
reacting a polyol and an isocyanate compound in the presence of a blowing agent and a particulate poly(phenylene ether) to form the polyurethane or polyisocyanurate foam,
wherein the isocyanate compound comprises, on average, at least two isocyanate groups per molecule;
wherein the polyol comprises a propoxylated sucrose, a propoxylated glycerin, an aromatic polyester diol, or a combination thereof; and
wherein the isocyanate compound comprises an oligomeric diphenylmethane diisocyanate having an average of greater than 2 and less than or equal to 4 isocyanate groups per molecule.

14. The polyurethane or polyisocyanurate foam of claim 13, wherein the polyurethane or polyisocyanurate foam is a polyurethane foam that is the product of a process characterized by an isocyanate index of 105 to 125.

15. The polyurethane or polyisocyanurate foam of claim 13, wherein the polyurethane or polyisocyanurate foam is a polyisocyanurate foam that is the product of a process characterized by an isocyanate index of 180 to 350.

16. An article comprising thermal insulation comprising polyurethane or polyisocyanurate foam comprising 1 to 50 weight percent, based on the total weight of the polyurethane or polyisocyanurate foam, of a particulate poly(phenylene ether) having a mean particle size of 2 to 8 micrometers; wherein the polyurethane or polyisocyanurate foam has a core density of 0.03 to 0.7 grams/centimeter$^3$ determined at 23° C. using ASTM D 1622-03.

17. A method of forming a polyurethane or polyisocyanurate foam, the method comprising:
reacting a polyol and an isocyanate compound in the presence of a blowing agent and a particulate poly(phenylene ether) to form a polyurethane or polyisocyanurate foam;
wherein the isocyanate compound comprises, on average, at least two isocyanate groups per molecule;
wherein the particulate poly(phenylene ether) has a mean particle size of 2 to 8 micrometers; and
wherein the polyurethane or polyisocyanurate foam comprises 1 to 50 weight percent of the particulate poly(phenylene ether).

18. The method of claim 17, wherein the polyol, the isocyanate compound, and water, if any, are present in amounts sufficient to provide an isocyanate index of 180 to 350.

19. The method of claim 17, wherein the polyurethane or polyisocyanurate foam has a core density of 0.02 to 0.06 grams/centimeter$^3$ determined at 23° C. using ASTM D 1622-03; wherein the particulate poly(phenylene ether) is a particulate poly(2,6-dimethyl-1,4-phenylene ether);
wherein the particulate poly(phenylene ether) has a particle size distribution wherein 90 percent of the particle volume distribution is in the range of 1 to 8 micrometers;
wherein the polyurethane or polyisocyanurate foam comprises 5 to 30 weight percent of the particulate poly(phenylene ether);
wherein the polyol comprises a propoxylated sucrose, a propoxylated glycerin, an aromatic polyester diol, or a combination thereof; and
wherein the isocyanate compound comprises an oligomeric diphenylmethane diisocyanate having an average of greater than 2 and less than or equal to 4 isocyanate groups per molecule.

* * * * *